United States Patent [19]
Robertson

[11] 3,937,918
[45] Feb. 10, 1976

[54] BEAM CARRIAGE TYPE AUTOMATIC ARC WELDING APPARATUS WITH WELDING HEAD TRACKING MECHANISM

[76] Inventor: Paul E. Robertson, 811 Creager St., Houston, Tex. 77034

[22] Filed: July 22, 1974

[21] Appl. No.: 490,762

[52] U.S. Cl............... 219/125 R; 219/124; 228/45
[51] Int. Cl.²......................................... B23K 9/12
[58] Field of Search.... 219/76, 124, 125 R, 125 PL; 228/25, 45

[56] References Cited
UNITED STATES PATENTS

| | | | |
|---|---|---|---|
| 2,182,575 | 12/1939 | Baird et al. | 219/124 |
| 2,357,376 | 9/1944 | Baird | 219/125 R |
| 2,749,421 | 6/1956 | Mikulak et al. | 219/125 R |
| 3,167,636 | 1/1965 | Bosteels | 219/125 R |
| 3,171,012 | 2/1965 | Morehead | 219/125 PL X |
| 3,670,139 | 6/1972 | Pandjiris et al. | 219/125 R |
| 3,704,822 | 12/1972 | Nomura | 219/125 R X |
| 3,779,444 | 12/1973 | Kensrue | 219/125 R X |

*Primary Examiner*—J. V. Truhe
*Assistant Examiner*—N. D. Herkamp

[57] ABSTRACT

Automatic arc welding apparatus in accordance with the present invention comprises a welding carriage movably supported by a horizontal guide beam, which carriage supports a plurality of arc welding heads for forming welds on a generally horizontally disposed work piece, wherein the welds may be of compound curvature. The welding head mechanisms are supported by compound connection apparatus that defines three interrelated axes that are cooperatively related to enable an electrode support to which welding wire electrode is automatically fed to precisely follow a joint of compound configuration that is established between angularly related portions of the work piece. Additionally, the welding head mechanisms are movable both vertically and laterally to facilitate proper positioning thereof to the work piece being welded.

27 Claims, 7 Drawing Figures

BEAM CARRIAGE TYPE AUTOMATIC ARC WELDING APPARATUS WITH WELDING HEAD TRACKING MECHANISM

FIELD OF THE INVENTION

This invention relates generally to beam carriage type automatic arc welding apparatus for forming elongated welds on work pieces and more specifically relates to beam carriage type arc welding apparatus that is specifically constructed to cause an electrode support to precisely track an elongated joint defined at the intersection of angularly related portions of the work piece, and which joint may be of compound configuration due to the interrelated shapes of the portions of the work piece that are to be welded into integral assembly.

BACKGROUND OF THE INVENTION

In the manufacture of flat bed trailers for use in hauling loads over roadways, such trailers typically include at least a pair of elongated support beams and perhaps more than two support beams which serve as the primary load supporting elements of the trailer construction. In the design of such beams, it is typically appropriate to construct the beams of generally "I" cross section, with the end sections of the beams having substantially lesser depth than the intermediate section thereof.

A typical flat bed trailer beam, for example, may be 44 feet in length and may be constructed from steel, such as A-441 grade low alloy steel. The upper flange of the beam may be composed of steel plate that is ⅝ inch in thickness by 6 inches in width. The web of the beam construction may be composed of steel plate in the order of 3/16 inch in thickness, while the lower flange of the beam may be composed of steel plate in the order of ⅜ inch in thickness by 6 inches in width. The web of the beam may be reduced to a width of 8 inches in the end sections while the central portion of the web may be at its full width of 22 inches. The transition from the 22 inch width of the central portion of the beam to the 8 inch width of the end sections is defined by a 92 inch curved transitioning section of the beam construction, the curves at the transition points being defined in approximately 20 inches in length.

The lower flange of the beam construction is typically attached to the web of the beam before the upper flange is welded to the web portion of the beam construction. Welding the lower flange to the beam, as an initial step, causes approximately 4 inches of camber to develop in the beam because of the stresses that develop during the welding process. After welding the upper flange to the web portion of the beam, a portion of the camber is removed by counterbalancing welding stresses. With the completed beam in its operative position, approximately 1½ inches of camber will remain, thereby causing the centermost portion of the beam construction to be 1½ inches above the level of the extremities of the beam. This amount of camber is desirable because of the deflection that occurs when the trailer assembly is fully loaded. For example, when a trailer of 44 feet in length is loaded with its maximum weight of 45,000 pounds of evenly distributed load, approximately 2½ inches of deflection will occur in the longitudinal beams of the trailer construction. This amount of deflection is within optimum design perimeters.

In the plant production of truck trailer beams such as those described above, it has been determined that the hand welding process adds materially to the cost of the beams and can render fabricated trailer beams excessively expensive because of the labor costs involved and because of the shop time necessary for hand welding of the beam constructions. It is desirable therefore to provide an automatic and substantially labor free welding process for the beams. Template controlled and sensor computer controlled welding devices are available for automatic arc welding and simple beam carriage type apparatus is available for welding in a straight line and on relatively flat work pieces, but these are undesirable for the various reasons explained below. The cost of template controlled or sensor computer controlled devices for accomplishing automatic welding of truck trailer beam constructions is considered excessively expensive for the volume of beam production that is typically required at a truck trailer manufacturing facility. Additionally, template controlled welding or sensor computer controlled welding of truck trailer beams necessitates design changes in the beam construction to accommodate the welding process and detracts from the design feasibility of the beams that are required for optimum load supporting characteristics.

Simple beam carriage type welding apparatus, that may be efficiently employed for making flat welds on flat work pieces cannot be utilized with any degree of efficiency or accuracy for welding along the curved joint that is established when the flanges of the beam construction are welded to the web portion of the beam. The simple joint tracking apparatus of a beam carriage type welding mechanism will not precisely follow the curve that is established when a curved flat bar or sheet is joined to a flat plate with a curved edge because the curve, when viewed from the 45° angle of the electrode accomplishing welding of a flange to the curved edge of the web, does not lie in a single plane. Actually, the curve is of compound nature, thereby requiring that the curve tracking apparatus be capable of substantial universal movement in order to properly track both the concave and convex curved sections of the beam.

It is also desirable to accomplish both fillet welds on either side of the web at the same time in order to eliminate any transverse bending or distortion that would otherwise occur if the welds were accomplished on one side only during a single pass of the welding apparatus. It is appropriate, therefore, to provide a pair of welding heads that are simultaneously operative to accomplish fillet welding on both sides of the web. In this case, each welding head must be capable of precisely tracking the compound curve that is encountered in order to cause the electrode support portion of the welding head to be precisely directed at the joint between the flange and the web at all times.

One of the problems that occurs when a simple beam carriage type welding apparatus is employed in an attempt to accomplish fillet welding of the compound curved joint between the web and flanges of a flat bed trailer beam construction is the tendency of the tracking rollers to climb the vertical surface of the flange due to the frictional engagement between the roller and the flange until the frictional engagement is overcome by forces acting downwardly on the welding head support mechanism. When the climbing force is overcome, the tracking roller will slip downwardly to its proper position relative to the joint between the flange and the result will be a discontinuity of the fillet weld that is being accomplished. When this occurs, the fillet weld will track away from its proper position to the joint between the flange and the web causing the weld being formed to also depart from its proper relation with the joint and, upon slipping, will cause increments of discontinuity to occur in the fillet welds being formed. This is very undesirable and results in the formation of a weak as well as aesthetically displeasing weld between the flange and the web portions of the beam construction. It is desirable, therefore, to provide a beam carriage type welding mechanism that is specifically constructed in such manner that the electrode support portion of the welding head will precisely track the joint between the flange and the web at all times and will not allow any slipping or jumping of the guide roller to occur which would otherwise cause the development of weld discontinuity and inaccuracy.

THE PRIOR ART

"I" beams and angle beam constructions have been formed by welding processes for an extended period of time and automatic welding apparatus for accomplishing welding of elements into an integral beam assembly have been developed as depicted in U.S. Pat. Nos. 2,432,495, to Baird, 3,469,067 to Agden et al., and 3,561,663 to Wenzleff. A beam carriage type welding mechanism has been employed in the past as taught by U.S. Pat. No. 3,650,457 to Fiegel et al., and automatic welding of beams utilizing a floor or surface supported guide joint tracking apparatus has been developed as taught by Bosteels in U.S. Pat. No. 3,167,636. Another typical beam carriage type welding mechanism is taught by U.S. Pat. No. 3,560,698 to Tanenbaum et al. which is also designed for accomplishing a fillet weld between the angularly related parts of large structural steel members.

It is therefore a primary object of the present invention to provide novel automatic arc welding apparatus of the beam carriage type that is capable of providing accurate, sound and aesthetically pleasing welds in work pieces having parts that are joined in such manner as to define a joint of compound configuration.

It is also an object of the present invention to provide novel arc welding apparatus of the beam carriage type that will track a joint to be welded accurately without slipping and jumping as the beam carriage apparatus is moved relative to the work piece, thereby providing a smooth and even weld joining the various parts of the work piece.

Among the several objects of the present invention is noted the contemplation of novel automatic arc welding apparatus of the beam carriage type that is specifically designed to traverse tack welds that are formed to secure the parts of the workpiece in temporary assembly.

An even further object of the present invention includes the provision of novel automatic arc welding apparatus of the beam carriage type that includes universally movable welding head mechanisms that effectively facilitate accurate tracking of joints to be welded even though the joints may be of compound configuration.

It is an even further object of the present invention to provide novel arc welding apparatus of the automatic beam carriage type that efficiently accomplishes welding on both sides of a work piece in a manner that prevents bending or distortion of the work piece by the heat generated during the welding process.

An even further object of the present invention contemplates the provision of novel automatic arc welding apparatus of the beam carriage type that effectuates automatically controlled and continuous welding enabling rapid formation of elongated welds of substantial length in quite rapid manner even though such welds may be of compound configuration.

It is another important object of the present invention to provide novel automatic arc welding apparatus of the beam carriage type that can effectively accommodate design changes in the work piece without requiring design changes or program changes in the welding apparatus.

Another object of the present invention contemplates the provision of automatic arc welding apparatus of the beam carriage type wherein welding heads are incorporated that are easily adjustable to vary the angular relationship thereof with the various parts of the work piece to be joined.

Other and further objects, advantages and features of the present invention will become apparent to one skilled in the art upon consideration of this entire disclosure including the specification and the annexed drawings. The form of the invention, which will now be described in detail, illustrates the general principals of the invention, but it is to be understood that this detailed description is not to be taken as limiting the scope of the present invention.

SUMMARY OF THE INVENTION

Automatic beam carriage type arc welding apparatus according to the present invention may include at least one and preferably a plurality of welding heads that are supported by a beam carriage welder and which will traverse an elongated work piece such as a truck trailer beam to be welded and develop an accurate and sound as well as aesthetically pleasing continuous elongated weld on the work piece even though the weld is of compound configuration. The beam carriage, together with its welding wire supply mechanism and welding control circuitry is movably mounted upon a generally horizontal beam and is moved linearly in generally parallel relationship with an elongated work piece that is disposed adjacent the carriage support and guide beam. An arm extends from the beam carriage and a pair of welding heads are guidingly and movably supported by the support arm in such manner that the welding heads are allowed freedom of movement relative to the support arm. Roller guide elements that establish engagement between the welding heads and the support arm are each independently movable but are urged toward one another and toward a vertical plane passing through the work piece, thereby causing the welding heads to be urged toward the joint of the work piece to be welded.

Each of the welding heads, assuming that multiple welding heads are employed, are positioned on opposing sides of the work piece and are simultaneously operative to accomplish simultaneous welding on both sides of the work piece. One of the welding heads is slightly offset relative to the other in order to prevent excessive application of heat in the area where the welds are simulaneously taking place.

Pairs of tracking rollers are provided on each of the welding head mechanisms, the tracking rollers being designed to pass over tack welds that may have been previously formed to retain the parts to be welded in temporary assembly. Each of the pairs of guide rollers is connected to an equilizer bar having a gun mounting bracket at one extremity thereof for connection of an arc welding gun thereto. A pivotal connection is established between the equilizer bar and a generally vertical connecting shaft which pivot establishes one of a plurality of axes of a compound connection assembly that facilitates universal movement of each of the welding head mechanisms. Another component of the compound connection means is defined by a plurality of guide roller elements that engage the generally vertically connecting shaft and serve to orient the connecting shaft and the equilizer bar and its tracking rollers with the roller mounted guide element that supports the welding head mechanisms relative to the horizontal support arm of the carriage mechanism. An intermediate connector element may be disposed immediately below the connector element and may be movably secured to the connector element by means of a generally vertically oriented pivot structure that establishes another component of the compound connection mechanism. The intermediate connector element may be urged to a neutral position by a pair of tension springs or by any other suitable urging means thereby causing the welding heads to return to a neutral optimum tracking position after leaving a curved portion of the work piece and continuing welding operations on straight portions of the joint between the various parts of the work piece. The intermediate connector element may be angulated in such manner as to cause the equalizer bar with its tracking rollers to be inclined with respect to each of the elements of the work piece to be joined, thereby causing the welding gun carried thereby to be directed in properly oriented manner toward the joint between the parts of the work piece.

A third pivotal connection of the compound connection means may be established between the lower extremity of the intermediate connector element and the upper portion of a terminal connector element that is also connected at its lower extremity to the equalizer bar by means of the pivot of the equalizer bar. The second pivot structure may be inclined relative to the vertical and may also be inclined relative to the various parts of the work piece to be joined and substantially normal to the access between the equalizer bar and the lower portion of the terminal connector.

The movable relationship of the roller mounted guide elements that guide the connecting shaft and the movable relationship of the connecting shaft to the connecting shaft guiding portion of the roller mounted guide element effectively allows the connecting shaft to seek optimum relationship to the work piece that is being welded. The cooperative relationship between the axis between the connecting shaft and the intermediate connector element, the axis between the intermediate connector element and the terminal connector and the axis between the terminal connector and the equalizer bar effectively allows the joint tracking mechanism of the welding head assembly to precisely and efficiently follow the joint between the parts of the work piece even though the joint may be of compound configuration when viewed from the orientation of the welding gun relative to the joint.

The work piece to be welded may be supported by a plurality of movable work piece support elements which may be individually moved as the welding mechanism traverses the work piece to accomplish the welding operation.

BRIEF DESCRIPTION OF THE DRAWINGS

So that the manner in which the above recited features, advantages and objects of the present invention, as well as others, which will become apparent, are attained and can be understood in detail, more particular description of the inention, brief summarized above, may be had by reference to the embodiment hereof, which is illustrated in the appended drawings, which drawings form a part of this specification.

It is to be noted however, that the appended drawings illustrate only a typical embodiment of the invention and are, therefore, not to be considered limiting of its scope, for the invention may admit to other equally effective embodiments.

IN THE DRAWINGS

The present invention, both as to its organization and manner of operation, together with further objects and advantages thereof, may best be understood by way of illustration and example of an exemplary preferred embodiment when taken in conjunction with the accompanying drawings in which.

DETAILED DESCRIPTION OF PREFERRED EMBODIMENT

Figure 1:
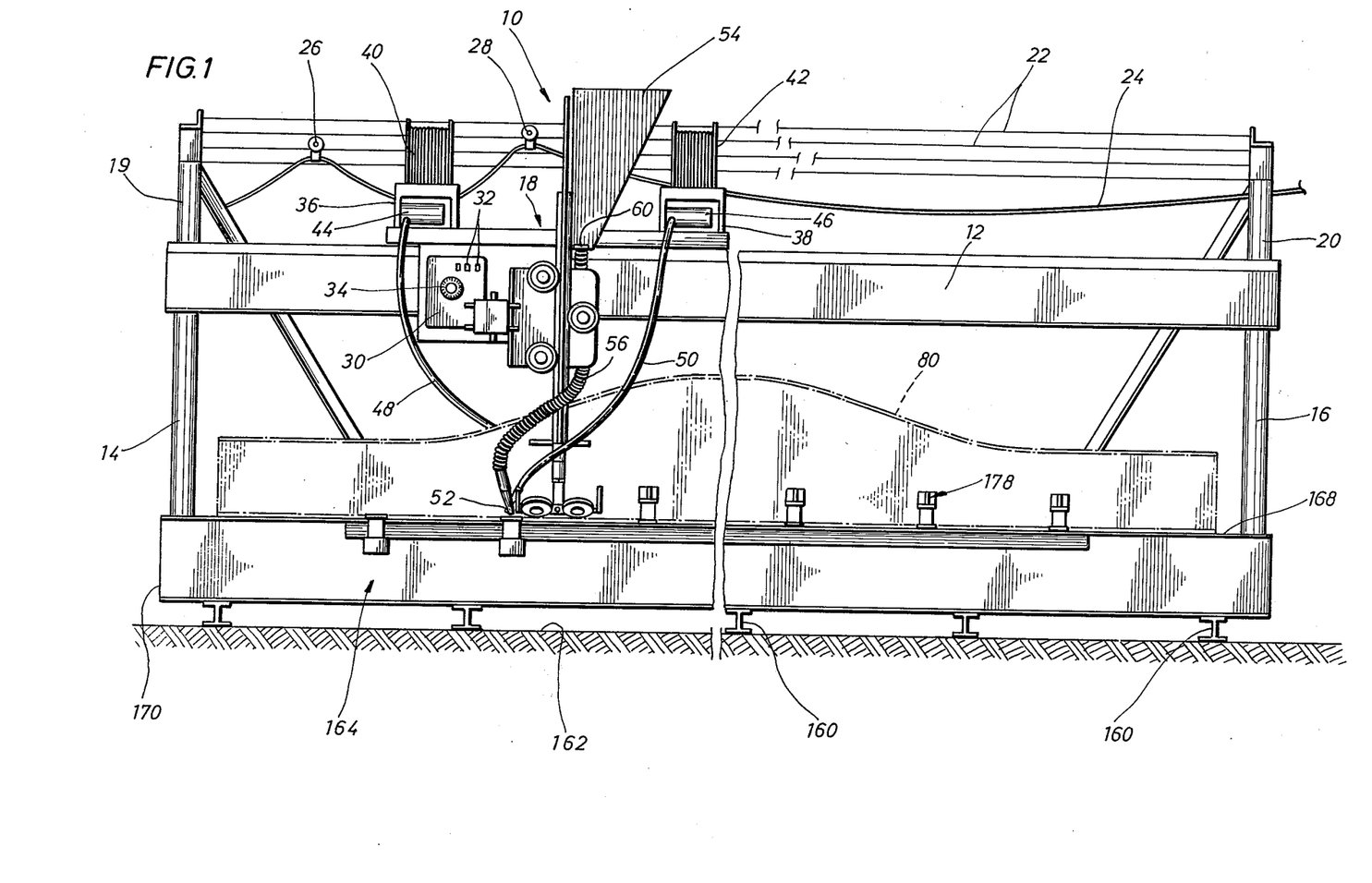
FIG. 1 is a partial elevational view of an elongated beam carriage welding mechanism constructed in accordance with the present invention, which welding mechanism is depicted in its welding relationship with a trailer truck beam being welded by the automatic tracking and welding apparatus, the truck trailer beam being illustrated in broken line.

Referring to the drawings and first to FIG. 1, there is shown a beam carriage type welding apparatus illustrated generally at 10 incorporating a generally horizontally disposed carriage guide beam 12 that is supported by vertical support elements 14 and 16. A carriage drive mechanism illustrated generally at 18 and which may take any one of a number of commercially available forms, may be carried by the guide beam 12 and may incorporate a conventional drive mechanism to propel the carriage relative to the beam 12 at a speed for optimum welding. Logically, the speed of the carriage mechanism may be variable to facilitate optimum welding, depending upon the material being welded and the welding electrode material being deposited by the welding process. Upright electrical cable support elements 18 and 20 may be disposed adjacent each extremity of the beam 12 and may support a plurality of cables 22 that allow an electrical supply conductor 24 to be transported along with the carriage, supplying electrical energy for driving the carriage and for accomplishing the arc welding operation. The electrical cable may be supported by a plurality of pulleys such as shown at 26 and 28 that are in turn supported by the cables 22. The pulleys 26 and 28 prevent the electrical cable from dragging on the floor as the beam carriage above the mechanism traverses during the welding operation.

The beam carriage 18 may be provided with a conventional welding control panel 30 incorporating switches 32 and an adjustment dial 34 to control energization and speed of the carriage as it traverses the beam 12. Electrode supply mechanisms 36 and 38 may incorporate electrode reels 40 and 42 that contain long lengths of welding electrode material. Electrode drive assemblies 44 and 46 serve when energized to drive the electrode wire from the reels 40 and 42 through tubular electrode guide elements 48 and 50 to the individual welding heads of the welding apparatus. The welding electrode supply and drive mechanisms may take the form of any one of a number of commercially available electrode feed mechanisms without departing from the spirit and scope of the present invention. Likewise, the welding guns to which the welding electrode is fed by the electrode feed mechanisms may take the form of any one of a number of conventional commercially available welding gun mechanisms within the spirit and scope of the present invention.

In order to accomplish submerged arc welding it is appropriate to feed a quantity of granulated flux material to the vicinity of the weld being formed and to deposit the flux in such manner that the weld being formed is submerged at all times. In accordance with the present invention a flux hopper 54 may be supported by the movable carriage 18 with flexible supply conduits 56 and 58 extending from the lower extremity of the hopper 54 to the welding guns 52 and 53 respectively. A simple slide valve element 60 located at the lower extremity of the hopper 54 may be moved between open and closed positions to allow granulated flux material to flow from the flux hopper 54 into the flexible flux supply conduits 56 and 58.

Figure 4:
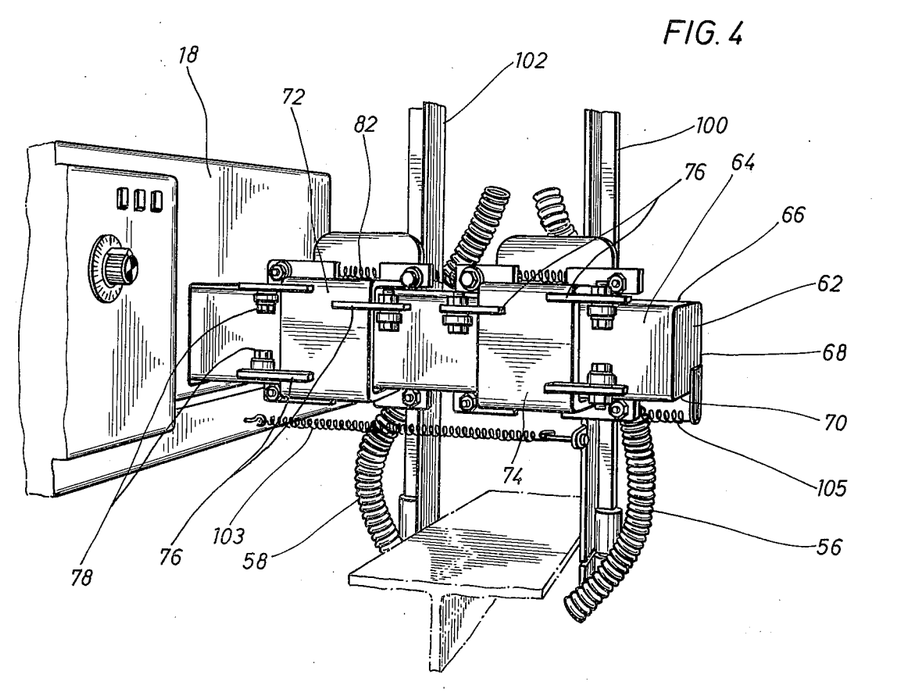
FIG. 4 is a fragmentary isometric view of the beam carriage welding mechanism of the present invention illustrating a portion of the carriage mechanism of the beam welder and depicting the horizontal support beam and roller mounted welding head guide elements in detail while depicting an upper portion of the beam being welded in broken line.

It is desirable to provide individual support for each of the welding head mechanisms defining the present invention and for this purpose, as illustrated in FIG. 4, a generally horizontally disposed welding head support arm 62 may be fixed at one extremity thereof by welding or any other suitable form of attachment to the structure of the welding carriage 18. Although the support arm 62 is illustrated as being of generally rectangular configuration, it is not intended to limit its structure to this particular configuration, it being obvious that support arms of other construction may function quite efficiently for the purposes intended. The support arm 62 defines 4 planar surfaces 64, 66, 68 and 70 that serve as guide surfaces for a pair of guide sleeves 72 and 74 that are received about the support arm 62 and are of mating configuration with the support arm.

A plurality of roller arms 76 extend from the guide sleeves 72 and 74 with guide rollers 78 being rotatably secured to the free extemities of respective roller arms with the rollers being disposed in guiding engagement with respective ones of the planar surfaces 64, 66, 68 and 70 of the horizontally disposed arm 62. The guide sleeves 74 therefore are capable of free but precisely guided movement along the length of the support arm 62.

Figure 6:
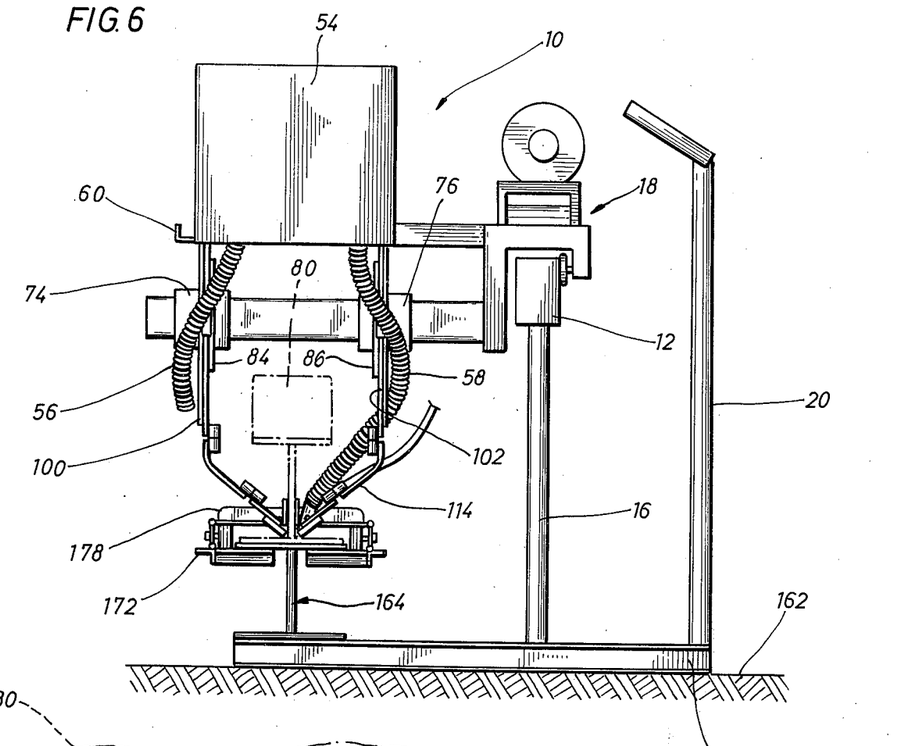
FIG. 6 is a partial end view in elevation, depicting the beam carriage welding mechanism together with the oppositely disposed welding head mechanisms positioned in welding relationship with a truck trailer beam that is being welded thereby, which beam is depicted in broken lines.

It is desirable to urge the guide sleeves 72 and 74 toward one another in such manner as to cause welding heads guided thereby to be urged toward the joint defined on either side of the parts of a truck trailer beam 80 being welded in the manner shown in FIG. 6.

Although the present invention is directed particularly to the fabrication of truck trailer "I" beams, it is not intended to limit the scope of the present invention solely to fabrication of such structures, it being obvious that simple "I" beams and any number of other fabricated structures may be efficiently welded through utilization of automatic arc welding mechanisms constructed in accordance with the present invention. For the purposes of simplicity, however, the present invention is directed to utilization for the welding of truck trailer beams wherein the parts of the beams are formed in such manner as to define joints of compound curvature when the joints are viewed from the angular relationship of the welding nozzles to the abutting parts being joined. A tension spring 82 may be connected at either extremity thereof to posts projecting from the guide sleeves 72 and 74 and may serve to urge the guide sleeves toward one another thereby urging the joint tracking apparatus and the respective welding nozzles toward one another such that the welding nozzles are urged toward the proper welding position thereof relative to the joint defined between the abutting parts of the truck trailer beam.

Figure 5:
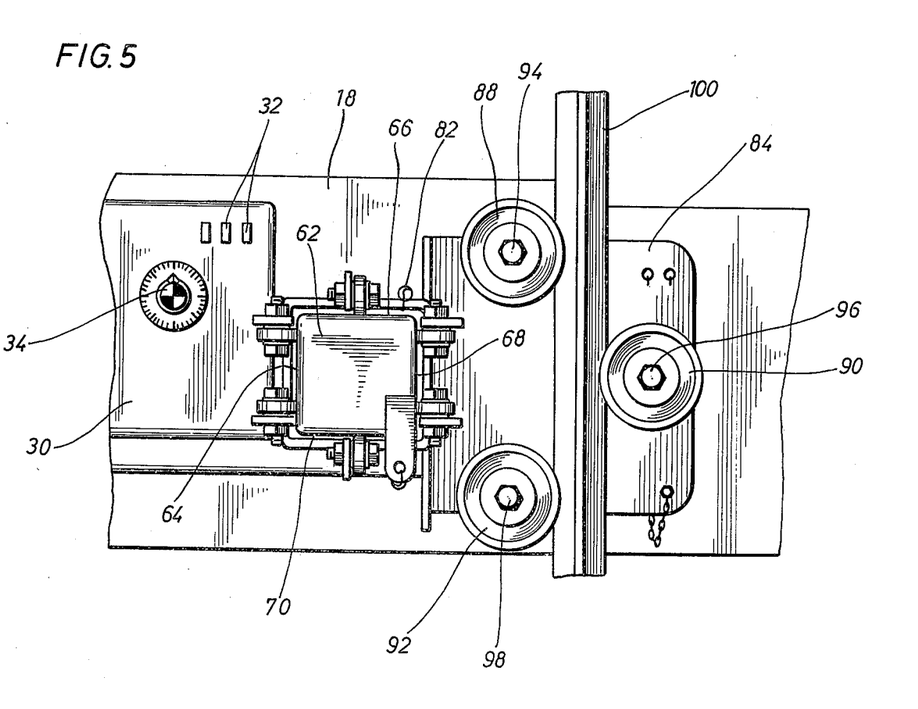
FIG. 5 is a fragmentary elevational view illustrating the relationship between the roller mounted guide elements and the horizontally disposed support arm together with the relationship of the movable welding head connector element with the roller guide elements in engagement therewith.

It is desirable that the welding head mechanisms have freedom of vertical movement in order that vertical components of the compound curvature of the joint being welded may be effectively traversed. In accordance with the present invention, such may be conveniently accomplished by a pair of guide plates 84 and 86 that may be secured by welding or by any other suitable form of connection to respective ones of the guide sleeves 74 and 76. Each of the guide plates may take the form illustrated in FIG. 5 wherein three guide rollers 88, 90 and 92 may be rotatably secured by studs 94, 96 and 98 to the guide plate structure. The three guide rollers may be positioned for engagement with edge surfaces of generally vertically oriented connecting shafts 100 and 102 that are freely movable relative to the guide rollers and to the guide plate 84. Each of the rollers 88, 90 and 92 may have a central groove formed therein defining opposed lateral flanges that are received on either side of the edge surfaces of the connecting shafts 100 and 102 thereby causing the connecting shaft to be restrained from any transverse movement even though the connecting shafts may move freely in vertical manner. The vertical shafts 100 and 102 may be of generally "T" configuration thereby providing a support structure that is capable of resisting any tendency to bend in either lateral direction.

Tension spring 103 is connected at one extremity to the carriage mechanism and at the opposite extremity to the connecting shaft 100, thereby urging the connecting shaft and the guide sleeve toward the carriage and causing the joint tracking mechanism controlled thereby to be urged toward the web portion of the beam being welded. Likewise, the opposite connecting shaft 102 and guide sleeve 72 is urged by a tension spring 105 in a direction away from the carriage, causing the joint tracking mechanism to be urged toward the opposite side of the web of the beam, the tension spring 105 being connected between the free extremity of the support arm 62 and the connecting shaft 102. One of the extremities of tension springs 103 and 105 is secured by means of an adjustment member thereby allowing the tension springs to be adjusted as desired to apply proper forces to the vertical elements 100 and 102 respectively. As illustrated in FIG. 4, for example, the right hand extremity of tension spring 103 is secured to the reverse bent hook portion of a threaded adjustment bolt having a nut that may be manually positioned relative to the bolt to properly tension to the spring.

At the lower extremity of the connecting shafts 100 and 102 may be mounted a pivot structure generally shown at 106 that may incorporate a pair of pivot sleeves 108 and 110 that are secured in assembly by a bolt 112 or other suitable structure defining a pivot. The sleeve 110 may be secured to the upper extremity of an intermediate connector element 114 that, because of the pivot 106 is rotatable relative to the connecting shaft 100.

Figure 3:
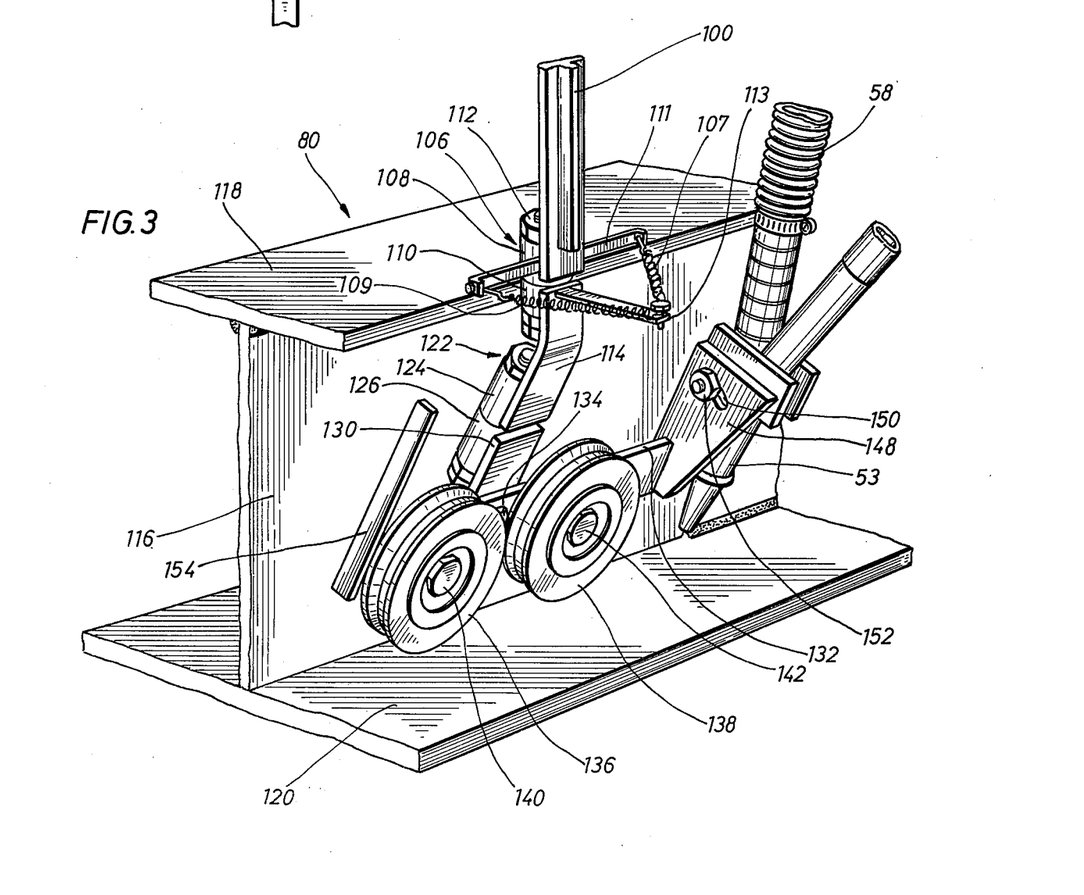
FIG. 3 is a fragmentary isometric view of the automatic beam carriage type welding mechanism set forth in FIGS. 1 and 2 and illustrating in more detail the lower portion of the welding head mechanism and welding gun assembly together with the relationship thereof to the beam structure being welded.

It is desirable for the intermediate connector element to return to a neutral position after a curved portion of the joint to be welded has been transitioned and this may be conveniently accomplished by providing a pair of tension springs 107 and 109 that are connected at one of the extremities thereof to opposing extremities of a spring support element 111 and are secured together at the opposite extremities thereof to the free extremity of a pivot control arm 113 that is carried by the intermediate connector portion of the tracking mechanism. The cooperating springs 107 and 109, reacting against the extremities of the support element 111 and the arm 113, cause the intermediate connector element to be centralized when a straight portion of the joint is being traversed. As shown in FIG. 3, the tension of springs 107 and 109 is also adjustable, one of the extremities of each of the springs being secured by a spring retainer bolt having an adjustment nut similar to the adjustment bolt structure for retaining springs 103 and 105.

Figure 2:
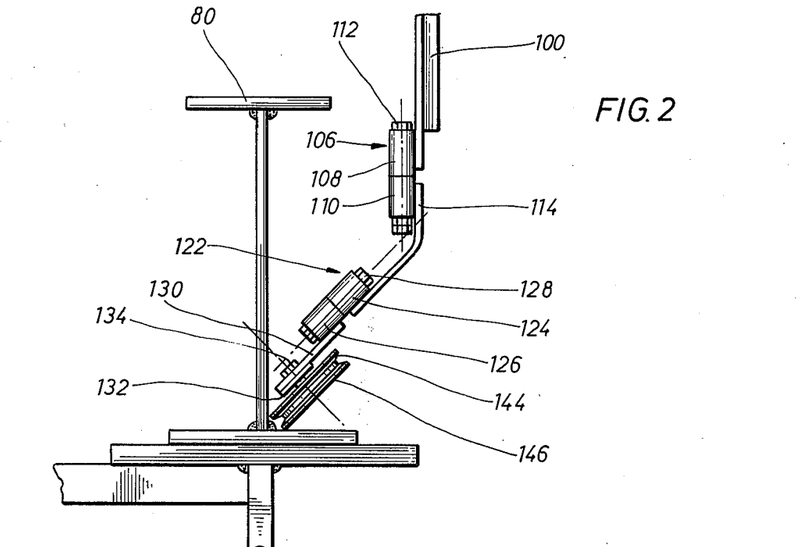
FIG. 2 is a fragmentary elevational view illustrating a truck trailer beam to be welded, with the lower portion of one of the welding head mechanisms disposed in tracking position relative to the truck beam structure and with the various axes of the lower portion of the welding head mechanism being depicted by broken lines.

The intermediate connector element 114 may be angulated as shown in FIG. 3 thereby causing those portions of the joint tracking mechanism disposed therebelow to be disposed in angulated relationship with the web 116 and the upper and lower flanges 118 and 120 of the truck trailer beam 80. As shown in FIG. 2, the orientation of the pivot 106 is generally vertical, having an axis that is disposed in generally parallel relationship with the connecting shaft 100.

It is also desirable that the welding head mechanism be capable of movement about an axis that is inclined with respect to the vertical in order that the welding nozzle may be directed in properly oriented manner at the joint formed between the web and flange of the beam being welded. This may be conveniently accomplished in accordance with the present invention by providing a second pivot structure illustrated generally at 122 which is defined by a pair of pivot sleeves 124 and 126 that are secured in pivotal assembly by means of a bolt or other suitable connector element 128 that defines a pivot about which the sleeves 124 and 126 rotate. Pivot sleeve 124 may be connected in any desirable manner to the lower extremity of the intermediate connector element 114 while the other sleeve 126 of the pivot 122 may be fixed to the upper extremity of the terminal connector element 130. Cooperative structural interrelation of the pivot elements 106 and 122 allow the lower portion of the joint tracking mechanism to pivot about both vertical and inclined axes in order that optimum positioning of the tracking mechanism and the welding nozzle connected thereto may be achieved at all times during welding operations.

It is also desirable that the joint tracking mechanism have multiple contact with the surfaces of parts of the truck trailer beam to be joined by welding and, in accordance with the present invention, this may be conveniently accomplished by an elongated equalizer element 132 that may be movably secured intermediate its extremities to the terminal connector element 130 by means of a pivotal element 134 that may conveniently take the form of a bolt or any other suitable connector element. The bolt or connector 134 defines a pivot forming an axis about which the equalizer element is pivotally connected to the terminal connector element, the axis being disposed in substantially normal relationship with the inclined axis defined by the pivot element 122 and being also disposed in inclined relationship with the vertical axis defined by the pivot element 106. A pair of tracking rollers 136 and 138 may be rotatably connected to the equalizer element 132 by means of bolts 140 and 142 or any other suitable connector elements. The tracking rollers 136 and 138 are mounted on either side of the pivotal connection 134 between the equalizer element and the terminal connector, thereby allowing forces induced to the welding mechanism to the tracking rollers to be centralized in the joint tracking portion of the welding head mechanism. As shown in FIG. 2, each of the tracking rollers may have grooves formed centrally therein defining a pair of circular flanges 144 and 146 which flanges contact respective surfaces of the structural elements to be welded in assembly to define the truck beam construction. The flanges of the tracking rollers 136 and 138 cooperate to provide multiple contact with the structural elements being welded about the joint defined between the structural elements, thereby allowing multiple reactive forces defined between the flanges of the rollers and the structural elements to induce orienting forces to the joint tracking mechanism.

At one extremity of the equalizer element 132 may be provided a welding nozzle support plate 148 having an arcuate groove 150 formed therein through which may be received a bolt 152 or other suitable connector that secures the welding nozzle assembly 153 to the welding nozzle support plate. Minor adjustment of the welding nozzle 153 relative to the equalizer element 132 and the plate 148 may be accomplished by orienting the bolt 152 relative to the arcuate groove or slot 150. With the joint tracking mechanism in proper position relative to the joint to be welded, the welding nozzle may be easily adjusted by means of the arcuate groove and bolt structure to achieve optimum positioning of the lower extremity of the welding nozzle relative to the joint to be welded.

At the opposite extremity of the equalizer element 132 may be provided an orienting arm 154 that allows the joint tracking mechanism to be manually oriented to its proper position at the beginning of the welding operation thereby allowing a weld to begin in precisely oriented manner with respect to the parts of the truck trailer beam being welded in assembly.

In most automatic welding mechanisms of the beam carriage type it is critically important to establish a precisely parallel relationship between the guide beam traversed by the carriage and the work piece being supported relative to the guide beam and carriage. Set-up time preliminary to beginning the welding operation is therefore generally quite long because of the accurate work piece to guide beam alignment required. The universal welding nozzle movement and accurate tracking capability of the present invention overcomes the necessity for extremely accurate positioning between the work piece and the guide beam, thereby allowing operating personnel to gain substantial savings in set-up time, and promoting the commercial feasibility of beam carriage welding through utilization of the present invention.

As illustrated in FIGS. 1 and 6, a plurality of support elements 160 may be supported on a floor or other suitable surface 162 and a horizontal support beam 164 may be positioned on the support elements in generally parallel relationship with the guide beam 12. The support beam 164 may be secured to the support elements 160 by welding, bolting or by any other suitable form of attachment and the support elements in turn may be connected in any suitable manner to the vertical posts 14 and 16 thereby positively maintaining the position of the support beam relative to the vertical posts and guide beam of the beam carriage structure.

Figure 7:
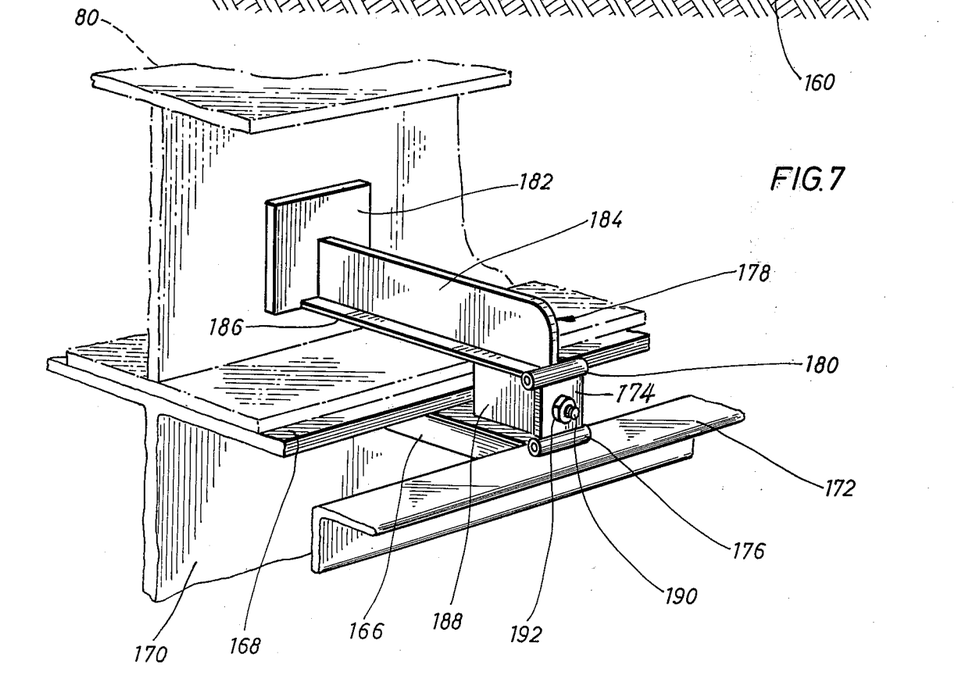
FIG. 7 is a fragmentary isometric view illustrating one of the plurality of work piece supporting elements in operative position relative to the web portion of a truck trailer beam or other work piece illustrated in broken line.

For rapid orientation of the parts of the beam to be welded, a plurality of locator bars 166 may be secured to the upper flange 168 and web portion 170 of the support beam 164, connection therebetween being established by welding or by any other suitable form of connection. To the outer extremity of the locator arms 166 may be welded or otherwise connected a structural element 172 that may be a simple angle member that is disposed in generally parallel relation with the support beam 164. A plurality of hinge plates 174 may be connected by hinge pivots 176 to the horizontally disposed structural element 172 in order that a movable connection is established between the hinge plates 174 and the structural element. The hinge or pivot 176 may be welded or otherwise secured to the structural element 172. To each of the hinge plates 174 may be pivotally connected a beam locator arm 178 which connection may be established by a pivot or hinge structure 180 secured by welding or the like to the upper extremity of the hinge plate 174 and to one extremity of the beam positioning arm 178. The arm 178 is therefore allowed to pivot about both of the pivot or hinge structures 176 and 180 in order that a locator plate 182 disposed at the free extremity of the arm 178 may be moved pivotally into engaging relationship with the web portion 116 of the truck beam to be welded without in any way binding against the surface of the web. The arm 178 may be of generally "T" configuration with plates 184 and 186 being secured in substantially normal relation one with the other. An elongated weld may serve to connect the plate 186 with the pivot structure 180.

It is desirable that the beam positioning arm 178 be disposed in generally horizontal manner in the operative position thereof in order that the locator plate 182 may be disposed in parallel engaging relationship with the web portion 116 of the truck beam structure 80. To accomplish the same a support block 188 may be connected to the upper surface of the arm 166 by welding or the like and the lower surface of the plate 186 of the beam positioning arm 178 may move into resting engagement with the upper portion of the block 188 in the operative position thereof. To cause minor inward or outward adjustment of the locator plate 182 relative to the web portion of the beam being welded, an adjustment element 190 may be provided that adjusts the position of the hinge plate 174 relative to the block 188. A lock nut 192 may be provided to lock the adjustment element 190 after proper position has been established between the hinge plate 174 and the support block 188.

Adjustment of the beam positioning and support mechanism may be initially established with a previously welded beam resting upon the support beam 164 in properly oriented relation therewith. The various beam positioning arms on either side of the web of the completed beam may be pivoted to the operative position illustrated in FIG. 7 and the adjustment element 190 of each of the beam positioning arm mechanisms may be adjusted after loosening of the lock nut 192 to achieve adjusting movement of the hinge plate 174 that is necessary to cause the locator plate portion 182 of the beam positioning arm 178 to be disposed in parallel and engaged relationship with the web portion 116 of the beam positioned upon the support beam. After each of the beam positioning arms have been so adjusted, fabrication of truck trailer beams can take place simply by positioning one of the flanges of the beam to be constructed upon the upper surface of the support beam 164 in properly oriented relation with the support beam and then by placing the web portion of the beam structure in assembly with the flange, which placement can occur simply by moving the web portion into engagement with the plurality of locator plates on the beam positioning arms and by bringing the beam positioning arms on the other side of the web into engagement therewith. When this is done the web will be oriented in normal relation to the flange to be welded thereto. A plurality of short task welds then may be made, causing the flange to be temporarily attached to the web structure of the beam being fabricated. The beam carriage welding mechanism then may be positioned at one extremity of the beam being fabricated and the opposed welding head may be brought into appropriate aligned engaging relationship with the flange and web portion of the beam structure and the joint tracking mechanism being appropriately adjusted by manipulating the position adjustment arm 154 as is necessary to bring the electrode carried by the nozzles into proper oriented relationship relative to the joint being welded. The beam carriage welding mechanism then may be energized causing an arc to be stuck and causing the carriage to travel on the beam structure 12 so that the welding nozzle is moved linearly as the welding operation is taking place. The tracking mechanism of the present invention will function efficiently regardless whether the weld being made is straight or of compound curvature because of the multi-axis relationship of the various parts of the joint tracking mechanism. When a compound curved portion of the joint between the web and flange portions of the track trailer beam is encountered, the equalizer element 132 will move about its pivot 134, conforming to the grade, i.e., upward or downward movement necessary to traverse the compound curve. Simultaneously the terminal connector element portion of the tracking mechanism will pivot about its inclined axis, established by pivot 122 and also about the pivot 106 establishing the vertical axis. The tracking rollers 136 and 138 are therefore allowed to follow the curvature of the joint being tracked precisely and the welding nozzle therefore is always precisely directed in properly oriented relationship with the joint in order that an optimum fillet weld may be established.

Generally it is appropriate to first place the beam 80 being welded in its operative position, opposite the position illustrated in broken line in FIG. 1 while welding the first flange in assembly with the web portion of the beam. The beam is placed in the position it normally assumes when in assembly with a trailer mechanism and the lower flange of the beam structure is installed. Support elements conforming to the configuration of the lower flange of the trailer beam are positioned on the support beam 164 and the lower web portion of the beam is lowered into assembly therewith. Clamps, not shown are utilized to restrain movement of the lower flange as it is welded to the web portion of the beam. The beam is then inverted to the position illustrated in broken line on FIG. 1 and the lower flange is placed in assembly with the web portion. The elongated sheet defining the upper flange of the beam structure will readily assume the configuration of the upper portion of the beam and the upper flange can be tack welded in place in the manner discussed above.

To accomplish automatic welding of both flanges to the web, the automatic beam welder mechanism may then be positioned in operative relationship with the joint to be welded and may be energized in the manner indicated above to cause development of fillet welds on each side of the web thereby securing the web and flange portions of the beam structure in integral assembly.

When the lower flange of the truck beam construction is welded into assembly with the web portion of the beam structure, considerable deflection of the beam occurs which, in a beam structure in the order of 44 feet in length, will cause the development of approximately 4 inches of camber. When the beam is inverted to the broken line position shown in FIG. 1 and the upper flange is welded to the web portion, reverse deflection takes place and the initial 4 inches or so of camber is reduced to approximately 1½ inches, which is the proper amount of camber to compensate for the deflection that takes place when the trailer is loaded. With a trailer of this type loaded with 45,000 pounds of evenly distributed load, the deflection will be in the order of 2½ inches, which is considered optimum.

In view of the foregoing it is clear that automatic arc welding apparatus of the beam carriage type, constructed in accordance with the present invention, has been provided herewith which overcomes the inadequacies of most beam carriage type welding mechanisms, by providing joint tracking mechanisms having facility for free movement about a plurality of cooperatively related axes effectively allows the tracking mechanism to freely negotiate joints to be welded, which joints may be of elongated compound curvature and yet which tracking apparatus effectively maintains the welding nozzle of the welding apparatus in properly oriented relationship with the joint to be welded. In addition to being capable of compound movement, the tracking mechanism of the present invention has, through cooperating guide roller supported mechanisms, facility for both vertical and lateral movement that effectively compensate for misalignment between the beam structure being welded and the support and guide structures of the welding mechanism. These features, were considered in conjunction, provide a beam carriage welder structure that may be rapidly set up for welding operations, thus contributing materially to the commercial feasibility of the welding mechanism. Because of the universal movement of the welding head mechanism that is provided by the unique tracking mechanism of the present invention effectively promotes formation of a fillet weld of pleasing appearance and which weld is of maximum strength. Moreover the weld being formed, although of compound configuration and considerable length may be formed quite rapidly utilizing relatively unskilled labor for insuring proper function of the welding mechanism.

Although the present invention has been discussed in connection with its application for welding truck beams of specific design, it is to be understood that the invention will function quite readily in accomplishing other types of welding, either forming straight welds or welds having a curvature of either simple or compound nature. The invention finds use in connection with virtually all types of welding especially submerged arc welding, inner shield arc welding and open arc welding. The invention will also function in an efficient and accurate manner when utilized in connection with other types of electric welding and also for gas welding and oxyacetylene metal cutting. It is not intended to in any way limit utilization of the present invention to one or more specific types of welding.

It is therefore seen that my invention is one well adapted to attain all of the objects and advantages hereinabove set forth, together with other advantages which will become obvious and inherent from the description of the apparatus itself. It will be understood that certain combinations and sub-combinations are of utility and may be employed without reference to other features and sub-combinations. This is contemplated by and is within the scope of the present invention.

What is claimed is:

1. In automatic arc welding apparatus having a generally horizontal carriage beam upon which is mounted a movable welding carriage that positions arc welding heads for causing the formation of elongated compound welds in work pieces having joints of compound configuration between angularly related portions to be welded, wherein the improvement comprises:
   connecting shaft means extending from said welding carriage;
   guide means being provided on said welding carriage and providing guiding support for said connecting shaft means;

compound connection means being provided on said connecting shaft means, said compound connection means including a first pivotal connection defining a first axis that is substantially parallel with said connecting shaft means and a second pivotal connection that defines a second axis that is in inclined relation to said first axis;

at least one joint tracking means being supported by said compound connection means and being positioned for contact with the angularly related portions of said work piece; and welding head means being connected to said joint tracking means and having a welding nozzle thereof positioned immediately adjacent the joint between said angularly related portions to be welded, whereby deviation of said joint causes pivotal movement of at least one of said pivotal connection means.

2. In automatic arc welding apparatus as recited in claim 1, wherein said joint tracking means comprises:
an elongated equalizing element;
a pair of roller guide elements being rotatably secured to said equalizing element; and
pivotal connector means interconnecting said compound connection means and said equalizing element and defining a third axis of said compound connection means, said third axis being oriented substantially normal to said second axis.

3. In automatic arc welding apparatus as recited in claim 2, wherein:
said connecting shaft means includes a plurality of sections;
said first pivotal connection interconnecting two of said sections of said connecting shaft, the axis defined by said first pivotal connection being disposed generally parallel with the elongated axis of said connecting shaft means.

4. In automatic arc welding apparatus as recited in claim 3, wherein:
said second pivotal connection interconnecting two sections of said connection shaft with said second axis defined thereby being disposed in angular relation to said first axis.

5. In automatic arc welding apparatus as recited in claim 1, wherein said joint tracking means comprises:
guide roller means being connected to said compound connection means and being positioned for engagement with each of said angularly related portions of said work piece;
welding head support means being fixed to said compound connection means, said guide roller means being rotatably secured to said welding head support means, said welding head means being carried by said welding head support means and being positioned to strike an arc and deposit weld metal at the joint between the angularly related portions of the work piece;
said connecting shaft means having first, intermediate and terminal relatively movable sections; and
said first pivotal connection interconnecting said upper and intermediate sections of said connecting shaft means and said second pivotal connection interconnecting said intermediate and terminal sections of said connecting shaft means.

6. In automatic arc welding apparatus as recited in claim 5, wherein:
said welding head support means is an elongated equalizing element;
said guide roller means is a pair of guide rollers supported in spaced relation on said elongated equalizing element and said equalizing element carrying said welding head means at one extremity thereof; and
a third pivot element being connected to said elongated equalizing element intermediate the extremities thereof and pivotally securing said elongated equalizing element to said terminal section of said connecting shaft means.

7. In automatic arc welding apparatus as recited in claim 6, wherein:
said third pivot element defines an axis disposed in substantially normal relation with the axis defined by said second pivot element.

8. In automatic arc welding apparatus as recited in claim 7, wherein:
each of said pair of guide rollers has a central groove formed therein defining flanges at each side thereof, said flanges each contacting one of said angularly related portions of said work piece and said central groove allowing said guide rollers to pass freely over tack welds temporarily securing said angularly related portions of said work piece in assembly.

9. In automatic arc welding apparatus as recited in claim 1, including:
said connecting shaft means is in freely movable relation with said carriage; and
spring means is connected to said connecting shaft means and said intermediate section of said connection shaft means and urges said joint tracking means into guiding contact with said work piece.

10. In automatic arc welding apparatus as recited in claim 9, including:
support arm means extending from said welding carriage; and
a welding head guide element being movably and guidingly supported by said support arm means, said connecting means being movably and guidingly supported by said welding head guide element.

11. In automatic arc welding apparatus as recited in claim 10, wherein said joint tracking means includes:
a plurality of connector guide rollers being supported by said welding head guide element, said connecting means guidingly interfitting with said connector guide rollers and being freely movable in a generally vertical direction.

12. In automatic arc welding apparatus as recited in claim 11, wherein said welding head guide element includes:
support sleeve means being loosely positioned about said support arm means and being of a configuration generally conforming to the configuration of said support arm means; and
a plurality of support sleeve rollers being carried by said support sleeve means and being disposed in rolling engagement with said support arm means.

13. In automatic arc welding apparatus as recited in claim 12, wherein said welding head guide element includes:
a roller guide support plate element being supported by said support sleeve means; and
said plurality of connector guide rollers being rotatably connected to said roller guide support plate element.

14. In automatic arc welding apparatus as recited in claim 1, wherein said arc welding apparatus includes:
a support arm extending from said carriage;
guide sleeve means being movably received by said support arm;
a plurality of roller elements being carried by said guide sleeve means and being disposed in guiding rolling engagement with said support arm; and
connector means being guided by said guide sleeve means and being movable in transverse relation to the direction of movement of said guide sleeve means, said compound connection means being supported by said connecting shaft means.

15. In automatic arc welding apparatus as recited in claim 14, wherein:
said guide sleeve means comprises a pair of guide sleeves movably and guidingly supported by said support arm; and
means interconnecting said guide sleeve means and urging said guide sleeve means toward one another.

16. In automatic arc welding apparatus as recited in claim 14, wherein said welding apparatus includes:
a connector guide plate being carried by said guide sleeve means; and
a plurality of guide rollers being rotatably supported by said connector guide plate and being disposed in receiving engagement with said connecting shaft means, allowing said connecting shaft means to be freely movable relative to said guide plate means.

17. In automatic arc welding apparatus as recited in claim 1, wherein said compound connection means comprises:
a support arm extending from said welding carriage;
guide means supported by said carriage and having guiding engagement with said connecting shaft means and allowing controlled translation of said connection shaft means along an axis defined by said support arm and an axis positioned in transverse relation to the axis defined by said support arm;
an intermediate connector section being pivotally connected to one extremity of said connecting shaft by said first pivotal connection;
a terminal connector section being pivotally connected to said intermediate connector element by said second pivotal connection; and
third pivotal connection interconnecting said joint tracking means and said terminal connector element and defining a third axis, said third axis being positioned in transverse relation to said first and second axes, said joint tracking means being engagable with a work piece being welded by said arc welding apparatus.

18. In automatic arc welding apparatus as recited in claim 17, wherein:
urging means interconnects said intermediate connector section and said connecting shaft means and imparts opposing balanced forces to said intermediate connector element, causing said intermediate connector section to move about said first axis from a neutral position only when other forces are applied thereto during tracking of said joint, said intermediate connector section being returned to its neutral position upon dissipation of said other forces.

19. In automatic arc welding apparatus as recited in claim 17, wherein said joint tracking means comprises:
an equalizer element being connected intermediate the extremities thereof to said terminal connector element by said third pivotal connection means;
a pair of tracking rollers being rotatably connected to said equalizer element on either side of said pivotal connection defining said third axis, said tracking rollers, during welding operations, being disposed in engagement with each of the parts of the work piece being welded into integral assembly; and
an arc welding nozzle being supported at one extremity of said equalizer element and directing an electrode quided thereby into proper welding relation with the joint between the parts of the work piece.

20. In automatic arc welding apparatus as recited in claim 19, wherein:
said tracking rollers each have a central groove defined in the periphery thereof, defining opposed generally circular flanges, said circular flanges each being disposed to engage opposite ones of the parts of the work piece being joined by welding.

21. In automatic arc welding apparatus having a generally horizontal carriage beam upon which is mounted a movable welding carriage that positions arc welding heads for causing the formation of at least one continuous elongated weld on a work piece to weld angularly related portions of the work piece into integral assembly, wherein the improvement comprises:
a support arm extending from said carriage;
at least one welding head guide element being connected in laterally movable and guided relation with said support arm;
connecting shaft means being movably received by said welding head guide element and having one extremity thereof extending to the vicinity of the work piece to be welded, said connecting shaft means having separate intermediate and terminal sections;
joint tracking means being connected to said terminal section of said connecting shaft means and being positioned for contact with the work piece to be welded;
welding nozzle means being connected to said joint tracking means; and a first pivotal connector interconnecting said intermediate section and said connecting shaft means and defining a first pivotal axis, a second pivotal connector interconnecting said intermediate section and said terminal section and defining a second pivotal axis being positioned in angular relation to said first pivotal axis, a third pivotal connector interconnecting said joint tracking means and said terminal connector and defining a third pivotal axis, said first second and third pivotal axes providing multi-axis.
freedom of movement of said joint tracking means enabling said joint tracking means to follow compound curved joints in said work piece, whereby deviation of said joint causes pivotal movement of at least one of said pivotal connection means.

22. In automatic arc welding apparatus as recited in claim 21, wherein said arc welding apparatus includes:
guide sleeve means being movably received by said support arm;
a plurality of roller elements being carried by said guide sleeve means and being disposed in guiding rolling engagement with said support arm; and
said connecting shaft means being guided by said guide sleeve means and being movable in transverse relation to the direction of movement of said guide sleeve means.

23. In automatic arc welding apparatus as recited in claim 22, wherein:
said guide sleeve means comprises a pair of guide sleeves movably and guidingly supported by said support arm; and
means urging said guide sleeve means toward one another.

24. In automatic arc welding apparatus as recited in claim 22, wherein said welding apparatus includes:
a connector guide plate being carried by said guide sleeve means; and
a plurality of guide rollers being rotatably supported by said connector guide plate and being disposed in receiving engagement with said connecting shaft means, allowing said connecting shaft means to be freely movable relative to said guide plate means.

25. In automatic arc welding apparatus as recited in claim 21, wherein:
urging means interconnects said connecting shaft means said intermediate connector element and imparts opposing balanced forces to said intermediate connector element causing said intermediate connector element to move about said first axis from a neutral position only when other forces are applied thereto during tracking of said joint, said intermediate connector element being returned to its neutral position by said urging means upon dissipation of said other forces.

26. In automatic arc welding apparatus as recited in claim 21, wherein said joint tracking means comprises:
an equalizer element being connected intermediate the extremities thereof to said terminal connector element by said third pivotal connector;
a pair of tracking rollers being rotatably connected to said equalizer element on either side of said third pivotal connector, said tracking rollers, during welding operations, being disposed in engagement with each of the parts of the work piece being welded into integral assembly; and
an arc welding nozzle being supported at one extremity of said equalizer element and directing an electrode guided thereby into proper welding relation with the joint between the parts of the work piece.

27. In automatic arc welding apparatus as recited in claim 26, wherein:
said tracking rollers each have a central groove defined in the periphery thereof, defining opposed generally circular flanges, said circular flanges each being disposed to engage opposite ones of the parts of the work piece being joined by welding.

* * * * *